United States Patent [19]

Diggs

[11] 3,915,384

[45] Oct. 28, 1975

[54] COMBINATION IRRIGATION AND TEMPERATURE CONTROL SYSTEM FOR PLANTS

[76] Inventor: Richard E. Diggs, 12 A Road, Carthage, Mo. 64836

[22] Filed: Mar. 13, 1975

[21] Appl. No.: 558,078

[52] U.S. Cl. ................ 239/272; 239/418; 239/426; 239/433; 239/542; 239/543; 239/550; 239/568

[51] Int. Cl.² ......................... B05B 1/20; B05B 7/00

[58] Field of Search .......................... 239/2 R, 8–10, 239/DIG. 7, 76, 269, 271, 272, 398, 433, 434, 429–431, 542, 543, 550, 568, 418, 421, 426

[56] References Cited

UNITED STATES PATENTS

| | | | |
|---|---|---|---|
| 1,383,449 | 7/1921 | Coles | 239/550 X |
| 2,563,300 | 8/1951 | Aker | 239/269 X |
| 2,929,563 | 3/1960 | Jones | 239/8 |
| 3,587,978 | 6/1971 | Rollow | 239/550 |
| 3,628,737 | 12/1971 | Norton | 239/426 |
| 3,735,778 | 5/1973 | Garnier | 239/DIG. 7 |

FOREIGN PATENTS OR APPLICATIONS

| | | | |
|---|---|---|---|
| 472,003 | 7/1914 | France | 239/421 |
| 886,031 | 1/1962 | United Kingdom | 239/433 |

OTHER PUBLICATIONS

A.P.C. (Alien Property Custodian) U.S. published application, Ser. No. 367,306, K. Schutz, published June 15, 1943.

*Primary Examiner*—Robert S. Ward, Jr.
*Attorney, Agent, or Firm*—Shoemaker and Mattare, Ltd.

[57] ABSTRACT

A combination irrigation and temperature control system for plants and the like, includes a spray producing fitting connected at its opposite ends with a water conduit and an air conduit, respectively. The fitting has a chamber therein into which air under pressure flows and a plurality of air openings in the side thereof, through which the air exits the chamber under pressure. The fitting includes separate areas on the outer surface thereof over which water is caused to flow in thin sheets, and the air openings extend through these areas, so that jets of air exiting the openings intercept the sheets of water and produce either a fine mist or fog or a spray of water droplets, depending upon the air pressure, whereby the fog produced can be used to provide a cover blanket to prevent or block heat radiation from leaf and soil surfaces, and the spray can be used to coat the leaf surfaces, whereby the latent heat of converting the spray to liquid and the liquid to ice warms the leaves to prevent freezing thereof. The system operates at low water pressure and uses very little water, and is thus exceptionally economical.

11 Claims, 3 Drawing Figures

COMBINATION IRRIGATION AND TEMPERATURE CONTROL SYSTEM FOR PLANTS

BACKGROUND OF THE INVENTION

This invention relates to a system or apparatus which can be used both to irrigate plants or crops and to control the temperature of the plants or crops to prevent freezing thereof.

In the prior art the usual practice is to provide one system or arrangement for irrigating crops and another system or arrangement for controlling the temperature thereof. For example, large sprinklers or drip irrigators or the like may be provided adjacent the plants to control the humidity thereof, and burner means, such as smudge pots or the like, may be positioned in operative relation with the crops to increase the temperature thereof and prevent freezing of the crops during cold weather. Other systems are known in the prior art wherein water is used both to irrigate the crops and to prevent freezing thereof. In one such prior art arrangement, water is caused to flow into an outlet nozzle under a low pressure, whereby the water is used to irrigate the crops, and when it is desired to control the temperature of the crops, the pressure of the water is raised such as to produce a spray or mist from the nozzle to thus prevent heat radiation from leaf and soil surfaces. However, this system requires the use of large amounts of water, as for example, from 50 to 100 gallons per minute per acre, and is thus quite expensive to use, and in areas where water is scarce, it is impractical to use this system at all.

With the present invention, on the other hand, a fitting is used which is connected at opposite ends thereof to a source of air under pressure and to a conduit conveying water at low pressure, and the water is caused to flow over the outer surface of the fitting, and the air is caused to flow into the fitting and thence outwardly through openings to intercept the water flowing thereover to produce either a fine mist or fog of water or a spray of larger droplets of water, depending upon the air pressure utilized, to effect irrigation of the plants and to prevent freezing of the plants. For example, the fine mist or fog of water vapor produces a blanket which prevents thermal radiation from plant and soil surfaces, and the larger droplets collect on the leaf surfaces, whereby the latent heat used to convert the vapor on the leaf surfaces to liquid and from liquid to ice warms the leaves and thus prevents freezing thereof. The system according to the present invention uses only about 5 gallons per minute per acre, and thus a 90 to 95% savings in water is realized, with a concommittant savings in money.

The invention can also be used to control the temperature of plants during hot weather by producing a spray of water which collects on the leaf surfaces and is then evaporated, and the heat required to convert the liquid water to vapor cools the leaves.

OBJECTS OF THE INVENTION

Accordingly, it is an object of this invention to provide an apparatus which can be used both to irrigate crops and to control the temperature thereof during either hot or cold weather, and which is exceptionally economical in construction and use.

Another object of the invention is to provide an apparatus for irrigating and controlling the temperature of plants wherein the apparatus includes a fitting adapted to be connected at one end thereof to a source of air pressure, and adapted to be connected at the other end thereof to a source of irrigating water, and wherein the water is caused to flow over an outer surface of the body and the air pressure is caused to flow into the body and thence outwardly through openings to intercept the flow of water thereover to produce a mist or spray of water, which not only irrigates the crops, but also produces a cover blanket to prevent thermal radiation from the leaf and soil surfaces.

DETAILED DESCRIPTION OF THE INVENTION

Figures 1, 2, 3:
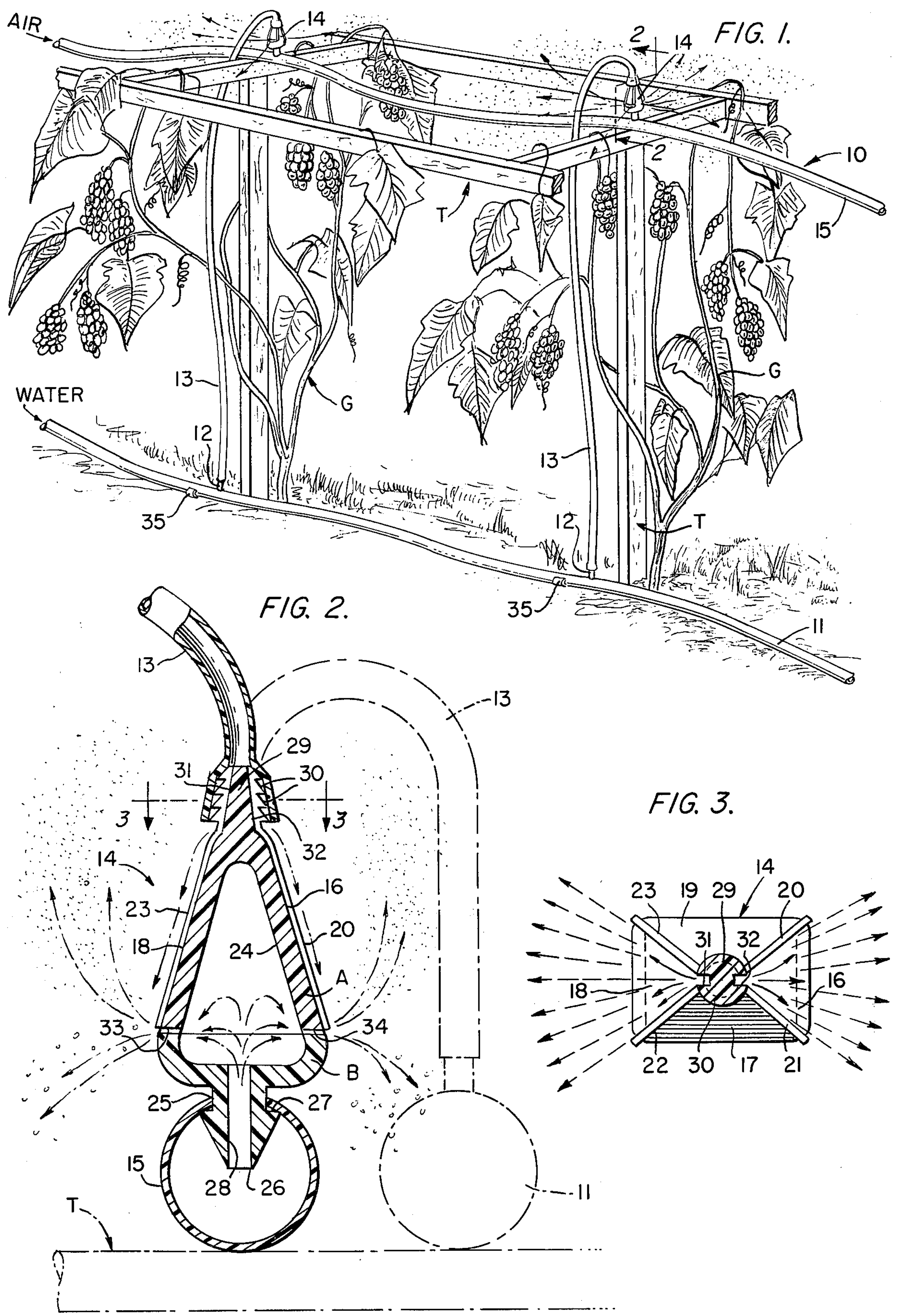
FIG. 1 is a perspective view of the apparatus according to the invention in operative association with a trellis and grapevines in a vineyard, for example.
FIG. 2 is a greatly enlarged, fragmentary, sectional view of the fitting as used in the apparatus of FIG. 1.
FIG. 3 is a view taken along line 3—3 in FIG. 2.

In the drawings, wherein like reference numerals indicate like parts throughout the several views, the combination irrigation and temperature control system or apparatus is indicated generally at 10 in FIG. 1, and comprises a water conduit 11 lying on the surface of the ground at the base of a trellis T, which supports a plurality of grapevines G or the like in a conventional and well-known manner. A plurality of flow control fittings 12 are attached to the water conduit 11, and connecting conduits 13 are connected at one end with the flow control fittings 12 and extend upwardly and are connected at their upper ends with fittings 14 for producing a spray of water and which are in turn connected with air conduits 15 supported on and extending along the top of the trellis T.

As seen best in FIGS. 2 and 3, the fitting 14 comprises a body of synthetic plastic or other suitable material and is substantially rectangularly shaped in transverse cross section and has four generally triangularly shaped sides 16, 17, 18 and 19, with upstanding ribs 20, 21, 22 and 23 extended along the opposite side edges of the sides and separating the sides from one another. The interior of the fitting 14 is hollow and defines a chamber 24 therein. A piercing projection 25 extends axially from the lower end of the fitting 14 and has a sharpened end 26 thereon and a tapered configuration defining an upwardly facing retaining shoulder 27, whereby the fitting may be attached directly to the air conduit 15 by pushing the sharpened end through the wall of the conduit until the retaining shoulder 27 engages behind the wall to maintain the fitting securely in place. An axial opening or passageway 28 extends through the piercing projection for providing communication between the interior of the air conduit and the chamber 24 for flow of air into the chamber, as indicated by the arrows. A tapered projection 29 extends upwardly from the upper end of the fitting 14 and has a generally circular configuration, and a plurality of annular, sawtooth serrations 30 on the outer surface thereof for effecting a secure gripping contact with the inner surface of the end of connecting conduit 13, and the serrations have a pair of axially extending flow passageways 31 and 32 therethrough extending from the upper end of the projection to the upper ends of areas 16 and 18 for flow of water to the areas 16 and 18.

The water flow areas 16 and 18 thus confine thin sheets of water flowing downwardly along the opposite sides of the fitting 14. The fitting has a pair of air exit slits 33 and 34 through the sides thereof extending along the bottoms of areas 16 and 18, whereby thin jets of air under pressure intercept the downwardly flowing sheets of water to produce spray of the water.

As indicated in FIG. 2, droplets of 10 to 40 micron size are produced, which rise to create a fog to block heat radiation, as described previously, and droplets of 40 micron size and greater produce a spray of water to control the temperature and humidity of the plants, as described previously.

The fitting 14 may be molded in two halves 14*a* and 14*b*, with the slits 33 and 34 being at the juncture of the two halves, and the two halves suitably secured together by means of a cement or the like, as desired.

Further, the water conduit 11 may be placed and supported on top of the trellis alongside the air conduit 15, as indicated in phantom line in FIG. 2, if desired.

Also, trickle-type irrigation fittings 35 may be attached to the water conduit 11 at spaced intervals therealong, as indicated in FIG. 1.

The water pressure in water conduit 11 is very low, being on the order of 5 to 10 pounds psi, and the air pressure may be anywhere from 10 to 200 psi, but ordinarily is from 10 to 15 psi. The air pressure and water pressure may be varied or regulated as desired to regulate the spray for different conditions encountered, and the fitting and conduits may be made of any suitable material, although they are preferably made of synthetic plastic material.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional was well as conjointly cooperative equivalents are, therefore, intended to be embraced by those claims.

I claim:

1. A combination irrigation and temperature control system for plants comprising a conduit conveying water under pressure and a conduit conveying air under pressure, a spray producing fitting connected at one end with the air conduit and having a chamber therein in flow communication with the air conduit, means connecting the other end of the fitting with the water conduit, a plurality of separate water flow areas on the outer surface of the fitting in flow communication with the water conduit whereby sheets of water flow on said areas, and said fitting having a plurality of air exit openings through the side thereof at said areas and through which air exits said chamber in pressurized jets, the jets of air intercepting the sheets of water and producing either a fog of very fine mist or a spray of larger droplets, depending upon the air pressure, to thus control the humidity and temperature of plants.

2. The combinations as in claim 1, wherein the fitting has piercing means on said one end and the fitting is attached directly to said air conduit by penetration of said one end of the fitting through the wall of the air conduit.

3. The combination as in claim 1, wherein the air exit openings comprise narrow slits extending transverse to the direction of flow of the water over the areas.

4. The combination as in claim 1, wherein the fitting is substantially rectangularly shaped in transverse cross section and has an upper end and a lower end, said one end comprising the lower end, a piercing means on the lower end penetrating the wall of an air conduit and said opening extending axially through the piercing means into communication with the chamber, a tapered extension on the upper end having a substantially circular cross section and a plurality of annular serrations thereon for gripping engagement with a conduit end into which the extension is inserted, said fitting having four substantially triangularly shaped sides extending from the lower end to the upper end thereof, said separate areas for flow of water comprising a pair of said sides on opposite sides of the fitting, ribs at opposite side edges of said pair of sides to confine the flow of water to said sides, said serrations having a pair of diametrically opposed flow channels therein extending from an upper end of a respective area to the upper end of the extension, and said air exit openings comprising a slit extending along the bottom edge of each of said areas.

5. The combination as in claim 2, wherein the air exit openings comprise narrow slits extending transverse to the direction of flow of the water over the areas, said fitting has a substantially rectangularly shaped transverse cross section and has four generally triangularly shaped sides extending from the upper end to the lower end thereof, said water flow areas comprising a pair of said sides on opposite sides of the fitting, said air exit slits extending along the bottom edges of said pair of sides, and a tapered extension on the upper end of the fitting having a plurality of annular serrations thereon for gripping engagement with a conduit end into which the extension is inserted, and said serrations having a pair of diametrically opposed flow channels therein extending from an upper end of a respective flow area to the upper end of the extension.

6. The combination as in claim 5, wherein the fitting comprises a synthetic plastic material.

7. The combination as in claim 1, wherein the means connecting the other end of the fitting with the water conduit comprises a connecting conduit, and a flow control means connected between the water conduit and connecting conduit.

8. The combination as in claim 7, wherein the fitting has piercing means on said one end thereof, said piercing means penetrating the wall of the air conduit directly connecting the fitting to the air conduit, and an axial extension on the other end of the fitting having a plurality of annular serrations thereon, said extension inserted into the end of the connecting conduit, and said serrations having a plurality of flow channels therein in communication with the flow areas for flow of water from the connecting conduit to the flow areas.

9. The combination as in claim 8, wherein support means is engaged with the air conduit supporting the air conduit and fittings near the top of plants for which the humidity and temperature is to be controlled.

10. A spray producing fitting for humidity and temperature control for plants, comprising a body having opposite ends and a chamber therein, one of said ends having an opening therethrough in communication with the chamber and adapted to be connected to a source of air under pressure, said body having an outer surface divided into a plurality of separate water flow areas, said other end adapted to be connected to a source of water for flow of water over said areas in thin sheets, and said body having a plurality of air exit openings in the side thereof in communication with the chamber and extending through said areas for effecting flow of jets of air under pressure from said chamber to intercept sheets of water flowing over the areas and thus produce a mist or a spray of larger droplets, depending upon the air pressure.

11. The fitting as in claim 10, wherein the fitting is substantially rectangularly shaped in transverse cross section and has an upper end and a lower end, said one end comprising the lower end, a piercing means on the lower end penetrating the wall of an air conduit and said opening extending axially through the piercing means into communication with the chamber, a tapered extension on the upper end having a substantially circular cross section and a plurality of annular serrations thereon for gripping engagement with a conduit end into which the extension is inserted, said fitting having four substantially triangularly shaped sides extending from the lower end to the upper end thereof, said separate areas for flow of water comprising a pair of said sides on opposite sides of the fitting, ribs at opposite side edges of said pair of sides to confine the flow of water to said sides, said serrations having a pair of diametrically opposed flow channels therein extending from an upper end of a respective area to the upper end of the extension, and said air exit openings comprising a slit extending along the bottom edge of each of said areas.

* * * * *